R. BERTHON.
APPARATUS FOR COLOR PHOTOGRAPHY.
APPLICATION FILED FEB. 4, 1909.

992,151.  Patented May 16, 1911.

Witnesses:
Jean Germain
Guillaume Pioche

Inventor:
Rodolphe Berthon
By R. Haddan
Attorney.

UNITED STATES PATENT OFFICE.

RODOLPHE BERTHON, OF LYON, FRANCE.

APPARATUS FOR COLOR PHOTOGRAPHY.

992,151.  Specification of Letters Patent.  Patented May 16, 1911.

Application filed February 4, 1909. Serial No. 476,161.

*To all whom it may concern:*

Be it known that I, RODOLPHE BERTHON, engineer, a citizen of the French Republic, residing at Lyon, in France, have invented certain new and useful Improvements in Apparatus for Color Photography, of which the following is a specification.

This invention relates to apparatus for producing photographic proofs capable of being projected and reproduced in colors by means of an objective with a diaphragm provided with tri-chromatic screens, and of plates, films or pellicles the surfaces of which are striated with transparent and refractive lines or dots.

It is well known that if a diaphragm with three apertures respectively covered by suitably selected red, green and blue violet screens is placed in the optical center of an objective, the colors of the images projected are not modified, but remain identical with the colors projected by the same objective without the tri-chromatic diaphragm. Moreover, examination of the projector from the plane of the projected image shows that the brilliance of the screens of the diaphragm varies according to the color of the particular part of image view, and according to the components of the color in question. Thus in the case of a yellow portion of the image, only the red and green screens will appear illuminated, and the violet screen will appear black. It follows from this that if at each point of a single sensitized layer a complete, infinitely small image of the objective with its three screens can be recorded, a tri-chromatic selection will be effected analogous to that obtained by the processes in which juxtaposed colored pigments are used, and if the image is projected by means of the apparatus which has served for producing the impression the exact colors of the original are reproduced. This can be effected by various means, which will be described hereinafter with reference to the accompanying drawings.

Figure 1:
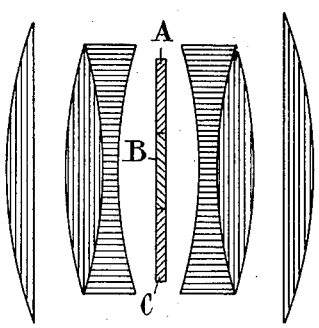
Figure 2:
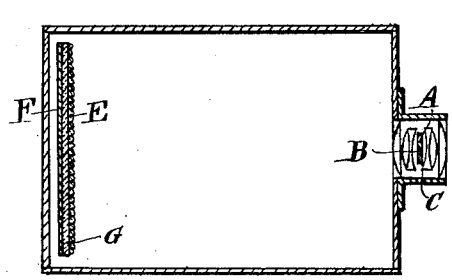
Figure 3:
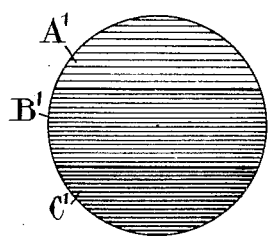
Figure 4:
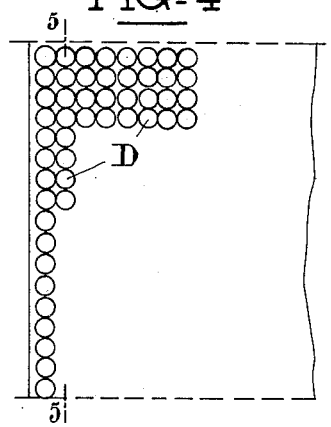
Figure 5:
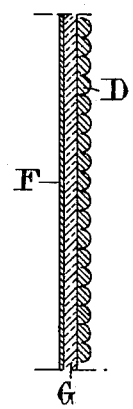
Figure 6:
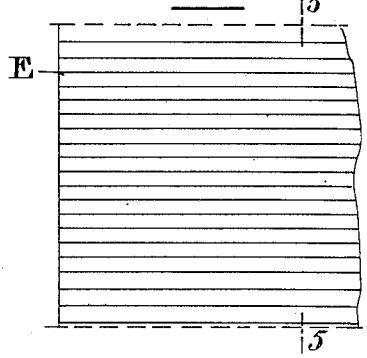
Figure 7:
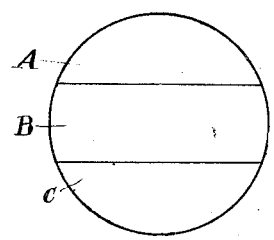

Figure 1 is a section of an anastigmatic objective with tri-chromatic screen, and Fig. 2 is a longitudinal section of a camera equipped with devices embodying my invention. Fig. 3 is a front view of the screen. Fig. 4 is a front view, on a considerably enlarged scale, of a plate or film with hemispherical, transparent, refractive protuberances, and Fig. 5 is a section on the line 5—5 of Figs. 4 and 6. Fig. 6 is a front view, on enlarged scale, of a plate or film with parallel, transparent, refractive ridges, and Fig. 7 is a front view of another form of screen.

For the purposes of the invention an objective is used which has in its optical center a diaphragm consisting of red, green and blue screens, marked in the drawing (Figs. 1 and 7) A, B and C respectively, or $A^1$, $B^1$, $C^1$ (Fig. 3). There is also used a suitable refractive surface, for example one covered with minute spherical protuberances D of microscopical proportions (Figs. 4 and 5), so that each point thereof acts as a true objective. The same result can be obtained by substituting for this protuberant surface colorless, refractive, spheroidal grains, which serve the same purpose as the facets of the aforesaid surface. If the screens of the diaphragm are apportioned into a series of microscopical parallel transparent portions, as hereinafter described for example in reference to Fig. 3, linear images of the objective may be used instead of complete micrographic images. Instead of the protuberant surfaces hereinbefore referred to, surfaces with semi-cylindrical ridges E (Figs. 5 and 6) are in this case preferably used, or colorless, cylindrical filaments, consisting of single strands, are placed on the surface. To prevent halation when the projection is being effected it is advisable to have the sensitive layer F and the ray-selecting surface D or E carried by the same support G, which may be of glass, celluloid, gelatin or other material. Plates or films may thus be prepared for ordinary views or for kinematographic purposes, etc.

The images obtained by the process described may be used in projection in various ways. If simply developed after exposure through the objective with tri-chromatic diaphragm, the plate or film, returned to the apparatus by means of which the view was taken, gives a negative image in which the colors of the objects are represented by their complementary colors. If the development is reversed (or positive) the projected image is positive and shows the real colors. Finally, the negatively developed image or the positively developed image may be projected by means of the original objective but with diaphragm screens of complementary colors. In the first case the projection is negative, but the colors are similar to those of the object; in the second case the projection is positive, but the colors are complementary to those of the object.

The tri-chromatic screens in the objective may be modified so as to produce on the sensitive layer a reticulated image capable of being projected without colored screens in the projecting objective. For this purpose the screens of the tri-chromatic diaphragm are striated with opaque lines, as shown in Fig. 3, the number of striæ being inversely proportional to the lengths of the fundamental waves of each colored screen; thus the striæ in the blue violet screen C' are closer together than those in the green screen B', and the striæ in the green screen are closer together than those in the red screen A'. In practice the number of striæ must be such that their linear projection on the sensitive layer gives at least sixteen lines per millimeter in the case of the red, nineteen in the case of the yellow-green, and twenty-two in the case of the blue-violet.

If the plates or films previously described are used for exposure the opaque lines on the tri-chromatic films register in all the zones corresponding to the radiations of the respective colors. It must be noted that in order that the surface of the image may be integrally reticulated the distance of the ridges or protuberances from the sensitive layer must be increased so that the linear projections of the three screens become mingled. The result is the same as if, during the exposure, three screens of the primary colors, lined in accordance with the lengths of the fundamental waves, were successively brought into contact with the sensitive layer; at the differently colored points of the image the different networks of lines register. This would not, however, allow of simultaneously registering the different colors, as does the striated tri-chromatic diaphragm shown in Fig. 3.

Exposed to light at a suitable angle, an image produced in the manner described presents the true colors of the object, by reason of simple refraction.

What I claim as my invention and desire to secure by Letters Patent of the United States is:—

1. An apparatus for producing projectable and reproducible proofs in colors, comprising an objective, a diaphragm in the objective having a tri-chromatic screen, a sensitive surface, and means interposed between the sensitive surface and the objective, whereby the images of the screen are separated by refraction at points close together, and projected in a microscopic state on the sensitive surface.

2. An apparatus for producing projectable and reproducible proofs in colors, comprising an objective, a diaphragm in the objective having a tri-chromatic screen, said screen striated with lines in numbers inversely proportional to the fundamental wave lengths of the colors of the screen, a sensitive surface, and means interposed between the sensitive surface and the objective, whereby the images of the screen are separated by refraction, and projected in a microscopic state on the sensitive surface.

In witness whereof I have signed this specification in the presence of two witnesses.

RODOLPHE BERTHON.

Witnesses:
 JEAN GERMAIN,
 GUILLAUME PIOCHE.